United States Patent [19]
Rodgers

[11] Patent Number: 5,343,190
[45] Date of Patent: Aug. 30, 1994

[54] SIGNALLING FOOTWEAR

[76] Inventor: Nicholas A. Rodgers, 15 Blair Lane, R.R. #1, Perkinsfield, Ontario, Canada, L0L 2J0

[21] Appl. No.: 944,923

[22] Filed: Sep. 15, 1992

[51] Int. Cl.$^5$ .................. G08B 23/00; A43B 23/00; H01H 35/02
[52] U.S. Cl. .................. 340/573; 36/137; 36/139; 200/61.45 R; 335/206; 362/103; 446/26; 446/130
[58] Field of Search .................. 340/573, 626, 323 R, 340/326, 689; 36/137, 139; 362/103; 446/26, 129-130, 71, 81; 335/205-207; 200/61.45 R, 61.48, 61.45 M; 455/100; 235/105

[56] References Cited

U.S. PATENT DOCUMENTS

| | | | |
|---|---|---|---|
| 3,859,651 | 1/1975 | Thomas, Jr. | 340/689 X |
| 3,960,376 | 6/1976 | Berlin | 273/449 |
| 4,264,899 | 4/1981 | Menzies et al. | 340/689 X |
| 4,298,910 | 11/1981 | Price | 362/35 |
| 4,339,747 | 7/1982 | Maybee | 335/207 X |
| 4,350,853 | 9/1982 | Ganyard | 335/205 X |
| 4,588,387 | 5/1986 | Swenson | 446/130 |
| 4,737,774 | 4/1988 | Chapman et al. | 340/573 |
| 4,771,394 | 9/1988 | Cavanagh | 340/323 R X |
| 4,848,009 | 7/1989 | Rodgers | 36/137 |

FOREIGN PATENT DOCUMENTS 335467 10/1989 European Pat. Off. .............. 36/139

Primary Examiner—Thomas Mullen

[57] ABSTRACT

An article of footwear is provided with a normally open reed switch and provides a visual or audible signal when the reed switch is closed. A magnet is provided movable under inertial forces between an ON position where it causes the reed switch to close and an OFF position where it allows the reed switch to open. The magnet is biased to OFF position.

9 Claims, 6 Drawing Sheets

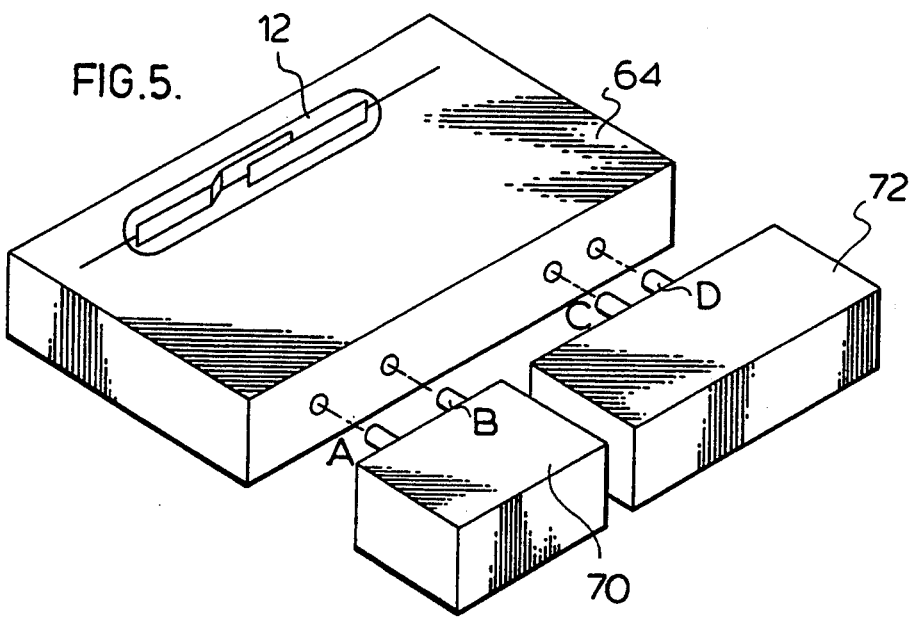
FIG.5.
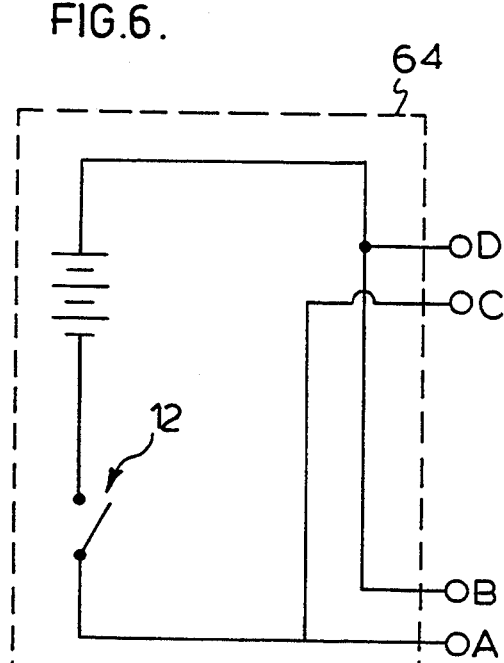
FIG.6.
CONTROL MODULE
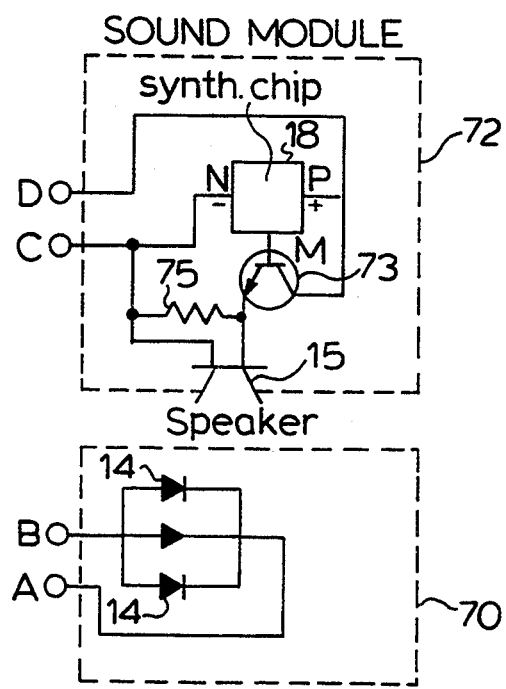
FIG.8
SOUND MODULE
LIGHT MODULE
FIG.7.

FIG.9. To light module Figure 7
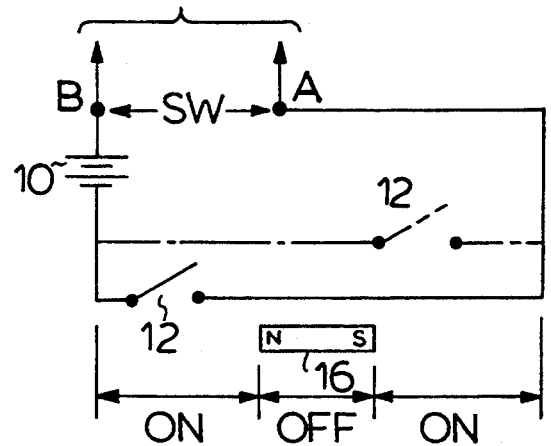
FIG.10. To sound module Figure 8
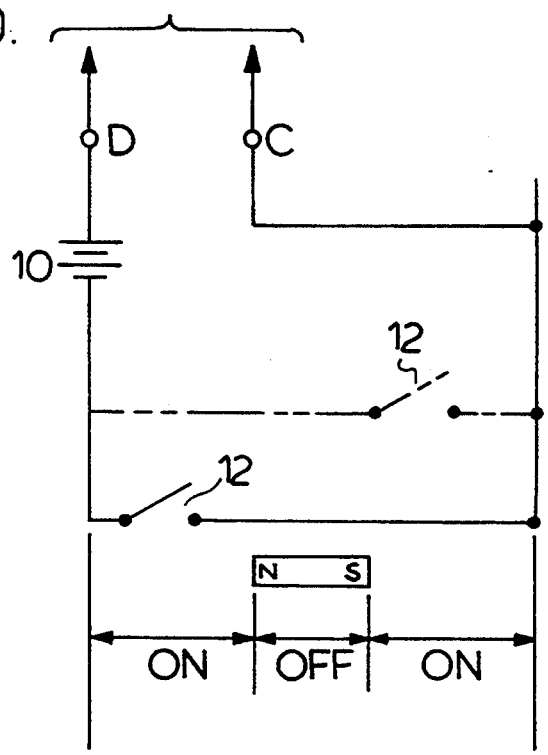

SIGNALLING FOOTWEAR

This invention relates to footwear designed to give an exterior sensible signal when in use.

By exterior sensible signal is meant either (a) a visual signal created by an exteriorly visible light emitting diode (LED), light bulb or other source; or (b) an audible signal. The term sensible signal means that such signal is sensible to someone near the wearer of the footwear.

BACKGROUND OF THE INVENTION

It is known to provide circuitry for installation in an article of footwear wherein the motion of the circuit while walking causes a light source to be switched on. Such a light source must be battery powered and preferably, to avoid undue battery wear and/or battery replacement, means must be provided to ensure that the light is turned off when the circuit is not in use.

SUMMARY OF THE INVENTION

In accord with this invention there is provided an article of footwear containing a series circuit comprising : a battery, at least one normally open reed switch and at least one sensible signalling means. The sensible signalling means may either be a light source visible exterior to the footwear or an audio source audible exterior to the footwear. A magnet is provided moveable between ON and OFF positions, and biassed to the OFF position. In the ON position the magnet is located to close the reed switch and in the OFF position to open it. The magnet is preferably biassed to an OFF position to save undue battery wear. When the reed switch is closed the sensible signal is activated, when the reed switch is open, it is not.

A particular advantage of reed switches over other switches is that they may be remotely actuated. Thus the reed switch and connected circuitry may be located in a control module while the actuator for the switch may be outside the module.

There may be a plurality of reed switches, each individually corresponding to an ON position, thus there may be more than one signalling means, each one activated by one of the reed switches. Alternatively multiple signalling means may be operated by a single reed switch. Although one reed switch may be open when another is closed there must be an OFF position where all signalling means are extinguished and the magnet should be biassed to this OFF position in order to save battery power.

In one preferred aspect of the invention, the signalling means is a light source (preferably an LED) and in an alternate aspect the signalling means is a sound source.

Whether the light or sound source is used the magnet mount must allow the magnet to move between one or more ON positions, on the one hand, and an OFF position, on the other hand, and preferably be biassed toward the OFF position.

It will be noted that if other means of extinguishing the signal means is provided, the bias of the magnet to OFF position is not as important.

In one preferred aspect of the invention the magnet is allowed to move in a locus of movement including the OFF position and at least one ON position.

In a preferred variant of the form of the invention in the previous paragraph the magnet is inertially moveable along a bore over a locus including an OFF position and at least one ON position and is spring biassed to OFF position.

In an alternative to the variant of the previous paragraph, the magnet is inertially moveable along a bore over a locus involving an OFF position and at least one ON position and is magnetically biassed to OFF position.

With either the spring or magnetic biasing described above, two springs or two magnets may be used to bias the switching magnet to a central OFF position between two ON positions adjacent opposite ends of the locus of movement.

In a further alternative of the invention the magnet may be spring or magnet biassed toward OFF position and the magnet may be shaped to ride as a floating piston in a bore which acts like a piston cylinder. Bladders in the shoe containing gas or liquid may be located at one or both ends of the bore to be compressed and expanded by the normal flexures of walking to move the magnet between an OFF position and one or two ON positions.

BRIEF DESCRIPTION OF THE DRAWINGS

In the drawings:

FIG. 5 is a schematic perspective view of the signalling and control modules associated with the arrangement of FIG. 1, FIG. 6 is a schematic wiring diagram of the control module of FIG. 5, FIG. 7 is a schematic wiring diagram of the light module of FIG. 5, FIG. 8 is a schematic wiring diagram of the sound module of FIG. 5, FIG. 9 is a schematic view of the operation of a movable magnet and reed switch to determine the operation of a light emitting diode (LED), FIG. 10 is a schematic view of the operation of a movable magnet and reed switch to determine the operation of a sound synthesizer, FIG. 11 schematically demonstrates the action of a linearly movable spring biased magnet, on a reed switch.

DESCRIPTION OF THE PREFERRED EMBODIMENT

Although the examples show shoes emitting both visible and audible indications, shoes in accord with the invention, will frequently be designed to provide only light, or only sound signals.

An 'Actuator' herein is the component designed to control the state of the reed switch. Various actuators are shown in FIGS. 9–22 inclusive.

FIG. 9 shows the basic circuitry for a control module using LED's having battery 10 connected in series with one or more normally open reed switches 12 (which are themselves connected in parallel) and one or more LED's 14 (shown in FIG. 7). The LED's are shown connected across terminals at jack elements A,B to illustrate that the LED's may, if desired, be part of a separate plug-in module (see also FIG. 5) for the circuit. Movement of magnet 16 aligned as shown, into proximity with a reed switch closes the reed switch while movement of magnet 16 out of the immediate proximity of the reed switch causes it to assume its naturally open state. Thus in either ON position of the magnet 16 one of the reed switches 12 will be closed and the LED's will be on. In the OFF position both reed switches will be open and the LED's will be OFF.

FIG. 10 demonstrates the analogous circuit using a sound synthesizer 72 (See FIG. 8). The sound synthesizer has terminals C,D. (The sound synthesizer may use any suitable synthesizer integrated circuit ('IC' or 'chip' 18 but I prefer to use MC 68HC05K0 manufactured by Motorola). As shown in FIG. 10 the battery 10 is connected through one or more the reed switch(es) 12 connected in parallel. The connections may be made through jack elements at C,D if a plug-in module (see FIG. 5) is used. The magnet 16 is shown in the neutral or OFF position at which time all reed switches will be open. When under motion of or flexure of the shoe, depending on design criteria to be described hereafter, the magnet moves into an ON position in proximity to a reed switch, the corresponding reed switch will close and the closure of either reed switch connects the battery across the C,D terminals activating the sound synthesizer. The synthesizer may be programmed to make a variety of sounds at the choice of the programmer, for example 'choo' for a children's shoe.

Figure 11:
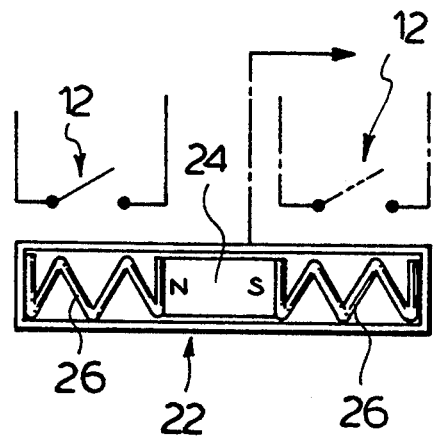
FIG. 11A shows an alternative construction to FIG. 11, FIG. 12 schematically demonstrates the action of a linearly movable magnetically biased magnet on a reed switch.

FIG. 11 schematically illustrates an actuator comprising a capsule 22 for embedment in a shoe containing a cylindrical magnet 24, which in this instance may be in either polarity. The magnet 24 is biassed toward a central or OFF position by opposed compression springs 26. Reed switches 12 for a circuit such as FIGS. 9 or 10 are located adjacent each end of the capsule 22 to be activated when the magnet moves toward such end (an ON position), Thus under the motion of walking or running, the magnet 16 moves intermittently toward one of the ends and actuates the proximate reed switch 12, to light the LED's 14 (FIG. 7) or activate the sound synthesizer 18, FIG. 8. When the motion of the shoes stops, the springs 26 move the magnet to OFF position turning off the visible or audible signal. If desired one reed switch 12 only may be used and only one spring 26 located to bias the spring toward an OFF position at the end of capsule 22 remote from the reed switch. In the actuator of FIG. 11, and its one spring alternative, the spring must be yielding enough to permit magnet travel to the ON position during walking.

Figure 11A:
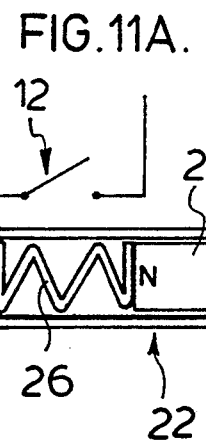

FIG. 11A shows an alternative construction wherein capsule 22 containing a single spring 26 biases the magnet 24 out of proximity with the single reed switch 12. Under the inertial forces of walking the magnet 24 may move leftward in tube 22 sufficiently to close the single reed switch 12 actuating a sound or light circuit, or both, during the interval ending when the spring 26 moves the magnet 24 out of effective proximity with reed switch 12.

Figure 12:
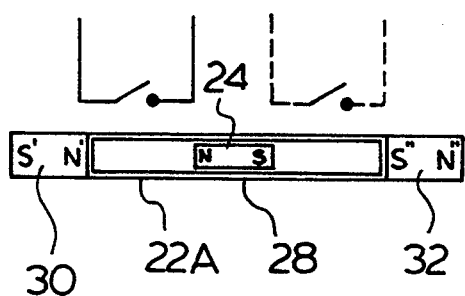
FIG. 12A shows an alternative construction of FIG. 12.

FIG. 12 shows a capsule 22A with a magnet 24 therein fixed in position at the end of capsule 22A biassed to the central OFF position by the bias magnets 30 and 32. Under the motion of walking or running the inertia of the magnet 24 will cause it to slide toward one end or the other of the capsule against a bias to reach an ON position and activate a reed switch 12 to cause the audible or visual signal as in the circuits of FIG. 9 or 10.

Figure 12A:
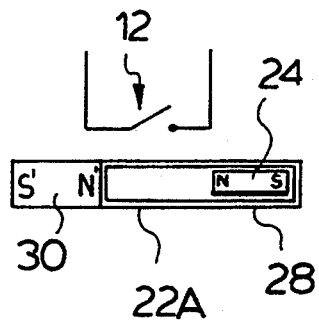

FIG. 12A shows an alternative construction wherein capsule 28 is associated with a single magnet 30 which biases magnet 24 out of proximity to the single reed switch 12. Under the inertial forces of walking the magnet 24 may move leftward in tube 22 sufficiently to close the single reed switch 12 actuating a sound or light circuit, or both, during the interval ending when the repulsion by the magnet 30 moves the magnet out of effective proximity to reed switch 12.

Figure 13:
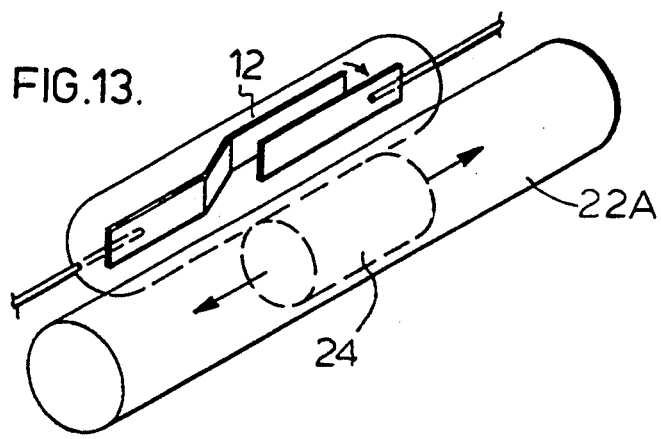
FIG. 13 is a perspective schematic view of a magnet and reed switch, FIG. 14 in section, and illustrates the use of an air driven magnet with a reed switch.

FIG. 13 is a schematic indication of an actuator capsule 22A (omitting the springs or bias magnets) a magnet 24 and a reed switch 12.

Figure 14A:
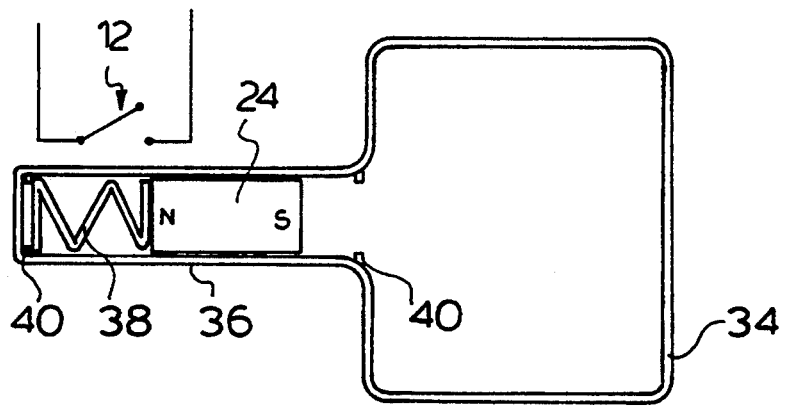
FIG. 14A shows an alternative construction to FIG. 14.
Figure 14:
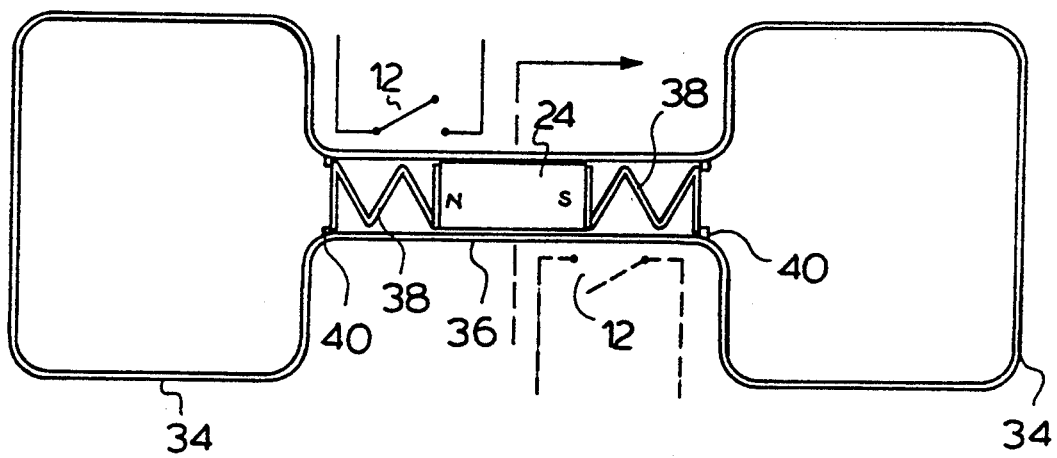
Figure 15:
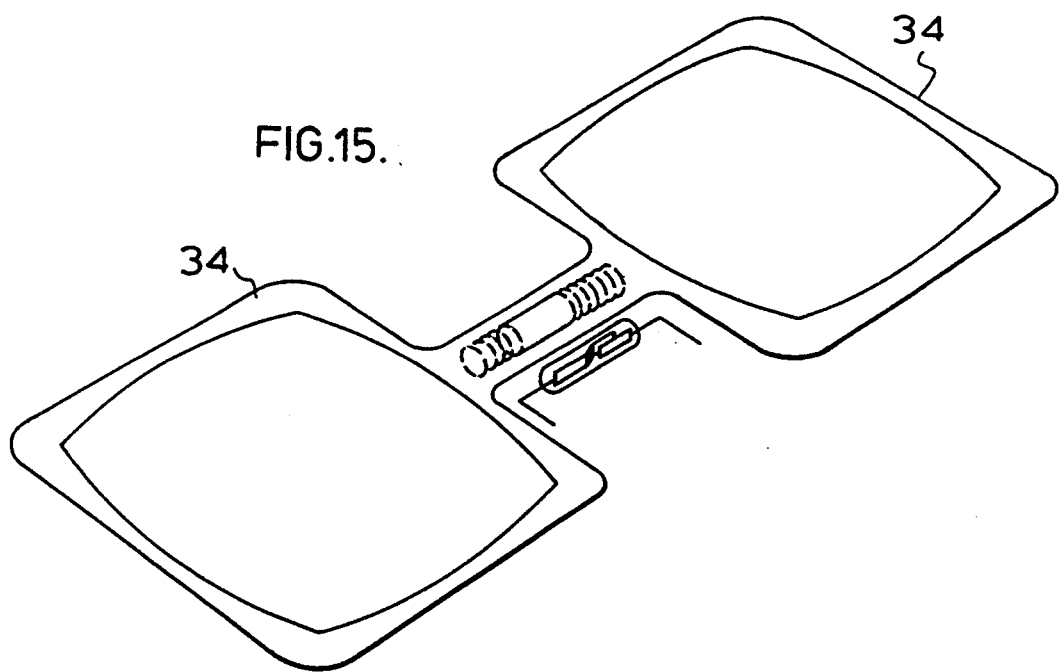
FIG. 15 shows, in perspective the use of an air driven magnet with a reed switch.

In FIGS. 14 and 15 a pair of bladders 34 is shown connected to a bore in cylinder 36 wherein a magnet 24 is shaped to act like a piston in a piston cylinder. Springs 38 bear on stops 40. In FIG. 14 the leftward or rightward movement of the magnet 24 is limited by bias springs 38 and the magnet 24. When the shoe is not flexed to compress one of the bladders 34 the springs drive the magnet 24 to a central location, that is to the OFF position away from either reed switch 12. Under the flexure of motion each bladder 34 volume is intermittently compressed and the air (or liquid) contents of the bladder move the magnet rightward or leftward to the ON position to close the reed switch and activate a visible or audible signal in accord with the circuitry of FIGS. 9 or 10. As an alternative to the spring biassing in the alternative of FIGS. 14 and 15, magnetic biassing by analogy to FIG. 12 may be used. A single bladder and reed switch may be used. Similarly, as an alternative to the arrangement of FIG. 11, excursions of the magnet 24 may only be allowed in one direction and a single reed switch used.

FIG. 14A (see also FIG. 21) shows an alternative construction where cylinder 36 is connected to a single bladder 34 and, opposite the bladder, contains a single spring 38 biasing the magnet 24 out of effective proximity to the single reed switch 12. Under pressure from bladder 34 the magnet 24 may move leftward in cylinder 36 sufficiently to close the single reed switch 12 activating a sound or light circuit, or both, during the interval ending when spring 38 moves the magnet out of effective proximity to reed switch 12.

Figure 1:
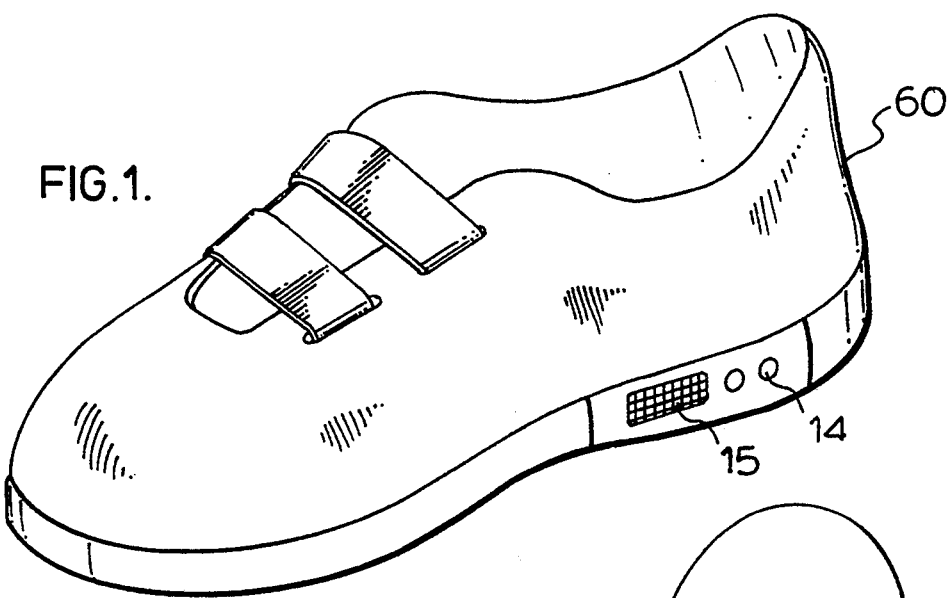
FIG. 1 is a perspective view of a shoe showing both visible and audible signalling means.
Figure 2:
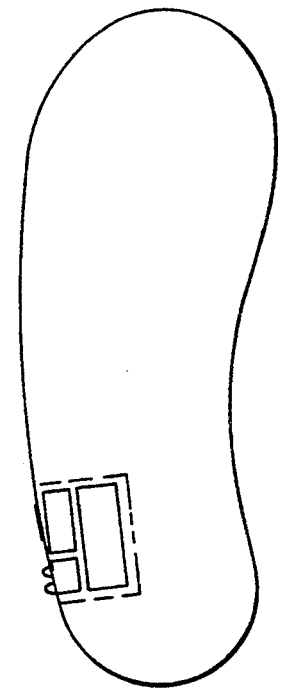
FIG. 2 is a schematic top view of FIG. 1, showing the disposition of the signalling means.
Figure 16:
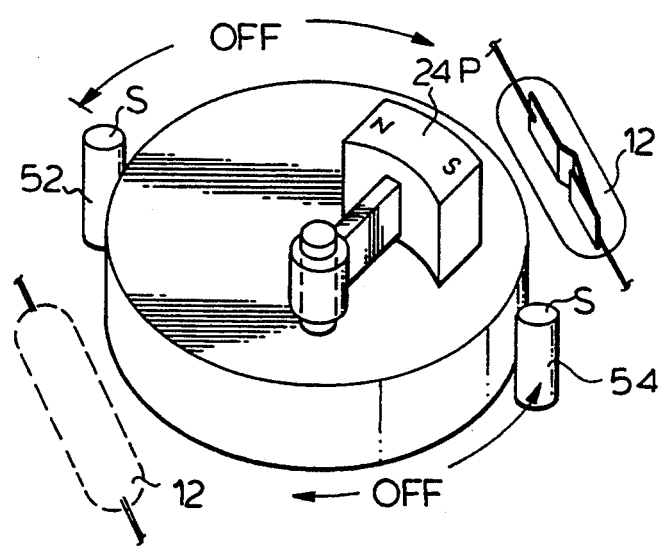
FIG. 16 shows a rotary driven magnet for use in controlling a reed switch, FIG. 17 schematically indicates the heel of a shoe with a linearly slidable magnet therein, FIG. 18 schematically indicates the heel of a shoe with an air driven magnet and a single air bladder, FIG. 19 schematically indicates the heel and sole of a shoe with an air driven magnet and double air bladders, FIG. 20 schematically indicates the heel of a shoe with a rotatably mounted magnet therein.
Figure 17:
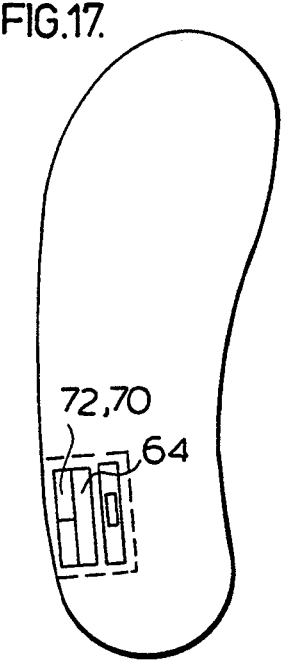
Figure 20:
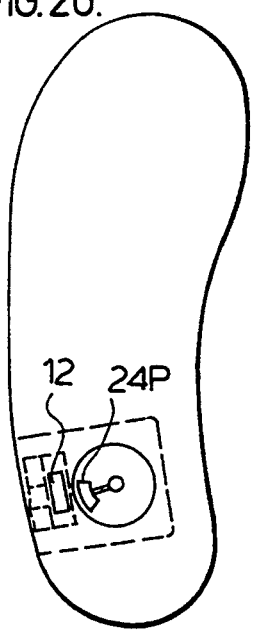
Figure 21:
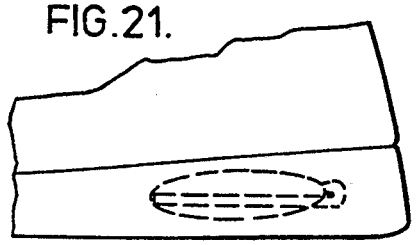
FIG. 21 is a side view of the heel of FIG. 18 with the single bladder therein.

FIGS. 16 and 20 show an alternative means for controlling the reed switch. The magnet 24P is pivotally mounted like a flywheel with polarity as shown. Stationary bias magnets 52 and 54 are both designed to be polarized south toward the locus of magnet 24P with the rotating magnet polarity as shown. When the shoe is stationary, the north pole of rotatable magnet 24P is held over one of the stationary magnets and the rotating magnet is kept in one of two OFF positions remote from either reed switches 12, so that these are open and the circuit of either FIG. 1 or FIG. 2 is inactive. When the shoe is moving the magnet 24P rotates or oscillates through an arc, from time to time closing a reed switch 12 and actuating the circuit of FIG. 9 or 10 to produce the audible or visual signal.

When the motion of the shoe stops, the rotating magnet 24P will come to rest in one of the OFF positions allowing the reed switch to open terminating the light and/or sound signal.

Instead of allowing the magnet 24P to travel through 360°, it may be constrained to oscillate through a small arc between an ON position and an OFF position, the latter determined by a magnet such as 54.

Figure 4:
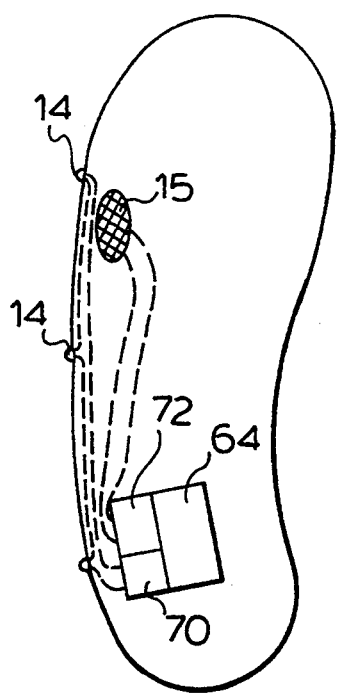
FIG. 4 is a schematic top view of the shoe of FIG. 3, showing the disposition of the signalling means.
Figure 3:
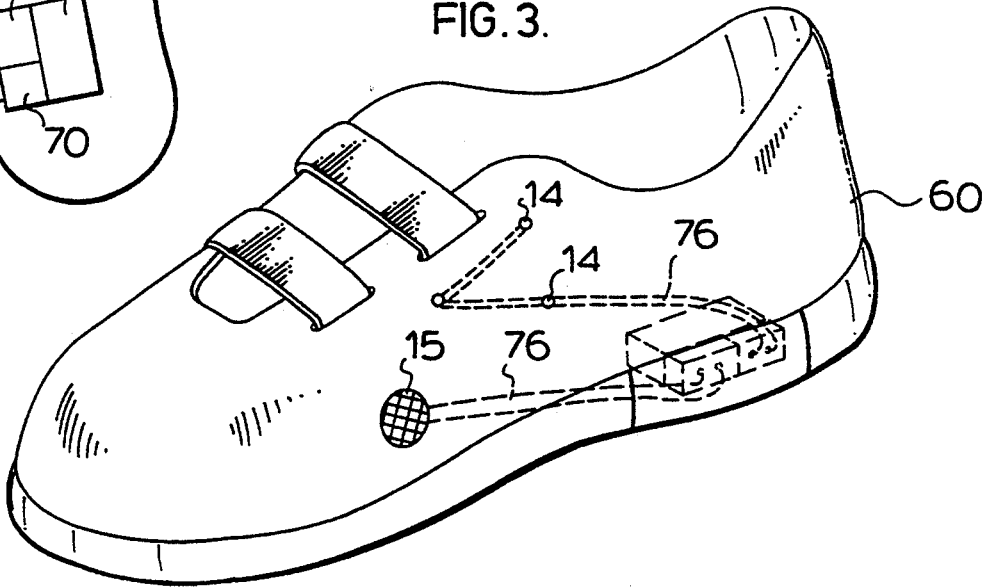
FIG. 3 is a perspective view of a shoe showing both visible and audible signalling means in an alternate disposition to that of FIG. 1.

FIGS. 1-4 show a running shoe 60 with a cavity in the heel containing the control module 64 a light module 70 and sound module 72. The light module and the sound module may be used together or as alternates. FIG. 5 shows the control module having female connections for jack connections A,B,C and D, corresponding to those shown in FIGS. 6-10 and adapted to receive either the light module or the sound module or both. These may be plugged directly into the control module, as shown to be located in the heel, as indicated by FIGS. 1 and 2 or the light and sound output devices LED's 14 or speaker 15) may be remotely located and connected by appropriate leads 76 as illustrated in FIGS. 3 and 4. Although such leads 76 may be wires moulded into the shoe I would prefer to use CAPTON (TM) film circuitry a thin plastic film with the conductor 76 printed on it produced by Dupont Chemical Co. and sold under the trade mark PYRALUX.

Figure 18:
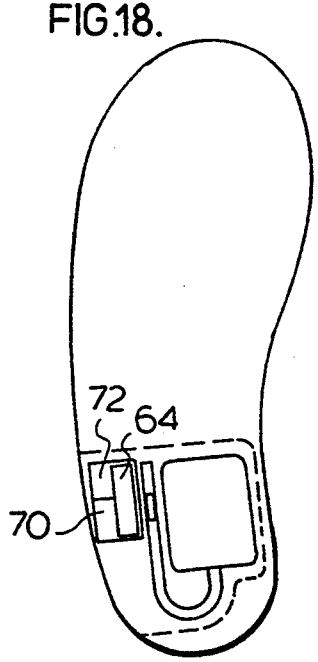
Figure 19:
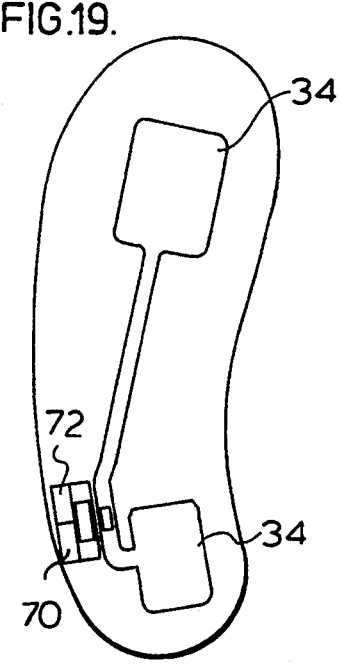
Figure 22:
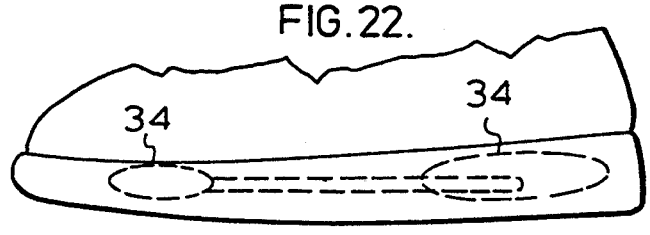
FIG. 22 is a side view of the sole and heel of a shoe with the double bladder of FIG. 19.

In FIGS. 17-20 the actuator tube is located near the control module 64 with the reed switch inside module 64 and this is suitable for the inertial and spinning magnet application of FIGS. 9-14, and 16. However, the bladder operated actuator for the actuation of the device in FIGS. 14 and 15 must, as shown in FIGS. 14 and 15 be located in the sole or heel of the shoe as shown in FIGS. 18 and 19. FIG. 19 shows a double bladder 34 design as shown in FIGS. 14 and 15 and the physical disposition of the bladders 34 is indicated in FIG. 22. FIG. 18 shows a single bladder design, discussed previously and FIG. 21 shows its disposition in the heel of a shoe.

The operation of the control module 64 of FIG. 6 will be obvious. Responsive to movement of a permanent magnet 16 or 24 (not shown in FIG. 6) into suitable proximity to reed switch 12, the latter will close, connecting battery power across terminals A and B on the one hand and across terminals C and D on the other hand. In connection with the light module 70 it is obvious that the LED's will light as soon as power is connected across terminals A and B. In connection with module 72, sound synthesizer integrated circuit ('IC' or 'chip' 18 is, as stated, preferably that manufactured by Motorola under number MC68HC05K0. The positive lead from terminal D is connected to the positive terminal P of IC 18 and the negative lead is connected to negative IC terminal N. When power is applied across terminals P and N a modulated output from terminal M is applied to the base of transistor amplifier 73. (For the transistor amplifier I prefer to use model 9012). The amplified output is applied to the speaker 15 to produce the sound. The synthesizer will give a choice of sounds including a sound similar to the sound 'choo' for children's shoes. The resistance 75 is connected in parallel with the speaker 15 and typically has the value 303 KΩ. Other sound synthesizers with their own characteristic connections are within the scope of the invention. Thus any shoe may have a light module alone, a sound module alone or both. On closure of the reed switch due to movement of the magnet during walking, the connected module is activated and light sound or both are produced until the reed switch is opened.

I claim:

1. A footwear signalling system, comprising:
   an article of footwear,
   a circuit mounted in said article and comprising a normally open reed switch connected in series with a battery and with signalling means,
   said signalling means being adapted, on closure of said reed switch, to emit a signal exteriorly of said article,
   a permanent magnet mounted in said article to move relative to said article between an ON position where said magnet closes said sreed switch and an OFF position where said magnet allows said reed switch to open,
   wherein said article includes a bladder opening into a cylindrical bore, wherein said magnet is shaped to act as a piston adapted to slide in said bore, said article further comprising means adapted to bias said magnet toward said bladder, wherein said bladder is designed to alternately expand and contract when said article is flexed and unflexed,
   wherein said magnet, which is under the influence of said biasing means and of the pressure existing within said bladder is adapted to assume said OFF position when said article is unflexed and to pass through said ON position when said article is flexed.

2. A footwear signalling system, comprising:
   an article of footwear,
   a circuit mounted in said article and comprising a normally open reed switch connected in series with a battery and with signalling means,
   said signalling means being adapted, on closure of said reed switch, to emit a signal exteriorly of said article,
   a permanent magnet mounted in said article to move relative to said article between an ON position where said magnet closes said reed switch and an OFF position where said magnet allows said reed switch to open,
   wherein said magnet is biased toward said OFF position and is adapted to be moved due to inertial forces towards said ON position,
   and wherein magnet is mounted in a bore and adapted to slide therein and is spring biased toward said OFF position.

3. A footwear signalling system, comprising:

an article of footwear;

a circuit mounted in said article and comprising a normally open reed switch connected in series with a battery and with signalling means, said signalling means being adapted on closure of said reed switch, to emit a signal exteriorly of said article a permanent magnet mounted in said article to move relative to said article between an ON position where said magnet closes said reed switch and an OFF position where said magnet allows said reed switch to open, wherein said magnet is baised toward said OFF position and is adapted to be moved due to inertial forces towards said ON position, and wherein said magnet is pivotally mounted to move through a locus of positions including said ON and said OFF positions.

4. A footwear signalling system, comprising:

an article of footwear, a circuit mounted in said article and comprising a normally open reed switch connected in series with a battery and with signalling means, said signalling means being adapted, on closure of said reed switch, to emit a signal exteriorly of said article, a permanent magnet mounted in said article to move relative to said article between an ON position where said magnet closes said reed switch and an OFF position where said magnet allows said reed switch to open, wherein said magnet is biased toward said OFF position and is adapted to be moved due to inertial forces towards said ON position, wherein said article includes a bladder opening into a cylindrical bore, wherein said magnet is shaped to act as a piston adapted to slide in said bore, said article further comprising means adapted to bias said magnet toward said bladder, wherein said bladder is designed to alternately expand and contract when said article si flexed and unflexed, wherein said magnet, which is under the influence of said biasing means and of the pressure existing within said bladder is adapted to assume said OFF position when said article is unflexed and to pass through said ON position when said article is flexed.

5. A footwear signalling system, comprising:

an article of footwear, a circuit mounted in said article and comprising a normally open first reed switch connected in series with a battery and with signalling means,.

said signalling means being adapted, on closure of said first reed switch, to emit a signal exteriorly of said article, a permanent magnet mounted in said article to move relative to said article between an ON position where said magnet closes said first reed switch and an OFF position where said magnet allows said first reed switch to open, wherein said magnet is biased toward said OFF position and is adapted to be moved due to inertial forces towards said ON position, wherein said circuit includes a second reed switch connected in parallel with said first reed switch and said two reed switches are collectively connected in series with said battery and said signalling means, and wherein the locus of said magnet during flexure and unflexure of said article includes an ON position for each switch and the OFF position.

6. A footwear signalling system, comprising:

an article of footwear;

a magnet located in said article, said magnet being adapted to move between an ON position and an OFF position during motion of said article, circuit means including a reed switch located in said article, said reed switch being adapted to be closed and opened when said magnet is in said ON position and said OFF position, respectively, said circuit means being adapted, responsive to a closed state of said reed switch, to produce a sensible signal exterior to said article, wherein said magnet is biased to said OFF position and mounted to move toward said ON position under inertial forces, wherein said magnet is mounted in a bore and adapted to slide therein.

7. A footwear signalling system, comprising:

an article of footwear, a magnet located in said article, said magnet being adapted to move between an ON position and an OFF position during motion of said article, circuit means including a reed switch located in said article, said reed switch being adapted to be closed and opened when said magnet is in said ON position and said OFF position, respectively, said circuit means being adapted, responsive to a closed state of said reed switch, to produce a sensible signal exterior to said article, wherein said magnet is biased to said OFF position and mounted to move toward said ON position under inertial forces, wherein said magnet is pivotally mounted to move through a locus of positions including said ON and said OFF positions.

8. A footwear signalling system, comprising:

an article of footwear, a magnet located in said article, said magnet being adapted to move between an ON position and an OFF position during motion of said article, circuit means including a reed switch located in said article, said reed switch being adapted to be closed and opened when said magnet is in said ON position and said OFF position, respectively, said circuit means being adapted, responsive to a closed state of said reed switch, to produce a sensible signal exterior to said article, wherein said magnet is biased to said OFF position and mounted to move toward said ON position under inertial forces, wherein said article includes a bladder opening into a cylindrical bore, wherein said magnet is shaped to act as a piston adapted to slide in said bore, said article further comprising means adapted to bias said magnet toward said bladder, wherein said bladder is designed to alternately expand and contract when said article is flexed and unflexed, wherein said magnet, which is under the influence of said biassing means and of the pressure existing within said bladder is adapted to assume said OFF position when said article is unflexed and to pass through said ON position when said article is flexed.

9. A footwear signalling system, comprising:

an article of footwear, a magnet located in said article, said magnet being adapted to move between an ON position and an OFF position during motion of said article, circuit means including a first reed switch located in said article, said first reed switch being adapted to be closed and opened when said magnet is in said ON position and said OFF position, respectively, said circuit means being adapted, responsive to a closed state of said first reed switch, to produce a sensible signal exterior to said article, wherein said magnet is biased to said OFF position and mounted to move toward said ON position under inertial forces, said circuit means further including a second reed switch connected in parallel with said first reed switch, and wherein the locus of said magnet during flexure and unflexure of said article includes an ON position for each switch and the OFF position.

* * * * *